Dec. 3, 1957  W. H. ELLINGSWORTH  2,815,083
PERAMBULATORY ARC WELDER

Filed July 5, 1955  2 Sheets-Sheet 1

INVENTOR
William H. Ellingsworth

Dec. 3, 1957  W. H. ELLINGSWORTH  2,815,083
PERAMBULATORY ARC WELDER

Filed July 5, 1955  2 Sheets-Sheet 2

INVENTOR
William H. Ellingsworth

United States Patent Office 2,815,083
Patented Dec. 3, 1957

2,815,083

PERAMBULATORY ARC WELDER

William H. Ellingsworth, Fern Creek, Ky.

Application July 5, 1955, Serial No. 519,748

6 Claims. (Cl. 180—19)

The present invention relates to electric arc welder units and more particularly to a self propelling, generating-portable type.

In portable equipment especially adapted for arc welding and cutting it has been customary to provide a prime mover and a dynamo as a unit mounted on a chassis for movement from scene to scene for operations on dispersed materials by animal power or by an auxiliary self propelled vehicle. Where manpower is employed for moving the equipment, which is customary practice, it has proven excessively expensive since several men were required; conventional motor driven trucks have been reconstructed and/or reorganized so that the engine for propelling the truck chassis could also be employed for driving the dynamo. While such truck equipments effected economy of manpower it has not proven economically successful by reason of high initial cost, which obviously, includes a forbidding investment in a specially constructed truck in addition to the complete welding apparatus. Equipment of the power truck type has found only sporadic uses as compared with the relatively low cost ubiquitious welding outfits mounted on a simple relative inexpensive chassis that are known as "undercarriage" in the related industries. Currently, the truck welder involves an initial investment of approximately three to five times that of the undercarriage type.

To provide a perambulatory undercarriage type arc welder with facile self propelled mobility may be noted among the several objects of this invention, which also includes: (A) means for instantly diverting the electrical output of the welding dynamo, when adjusted for a given welding operation, to the motor for propelling the undercarriage without disturbing the control apparatus that conditions the dynamo for delivering current having the desired characteristics for welding, and then returning the apparatus for use as a welder, all without having disturbed the said control apparatus of the dynamo in order that welding operations can be resumed instantly; (B) the provision of unitary manually operable means for effecting instantly any of the following functions or desired combinations thereof: (1) establishing electrical connections for conducting the output of the dynamo to a propelling motor or welding rods; (2) steering the undercarriage; (3) rotating the motor armature in either direction in order to propel the undercarriage either forwardly or rearwardly.

The invention accordingly comprises the elements and combinations of elements, features of construction, and arrangements of parts which will be exemplified in the structures hereinafter described, and the scope of the application of which will be indicated in the appended claims.

In the accompanying drawings, in which is illustrated one of the various possible embodiments of the invention and a modification thereof, Figure 1 is a perspective view of a complete perambulatory arc welder, referred to in the preamble and hereinafter as an "undercarriage."

Figure 1:
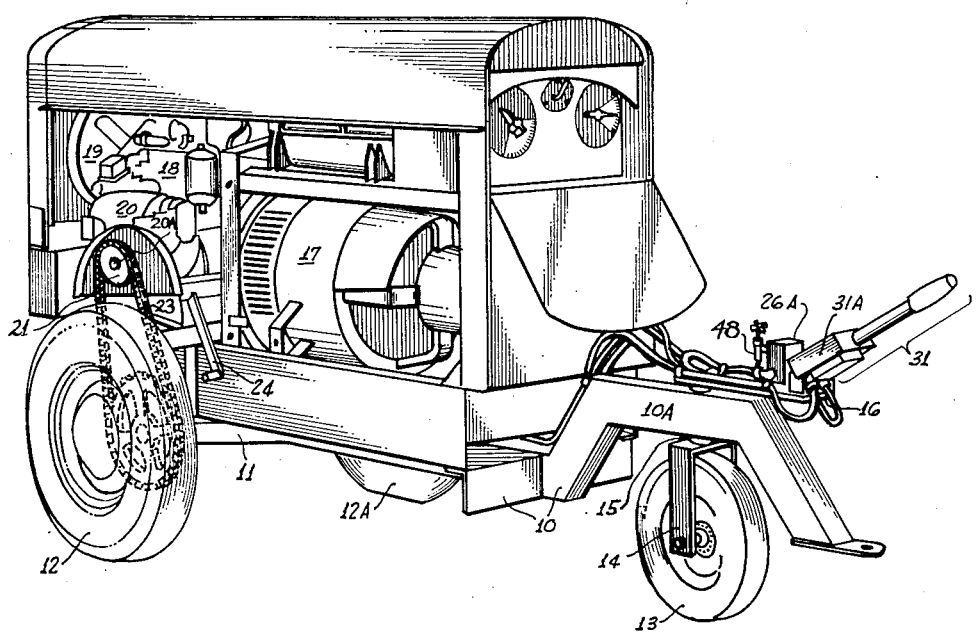
Figure 1A is a perspective view of a modified chassis for carrying the equipment required to complete an undercarriage.
Figure 2:
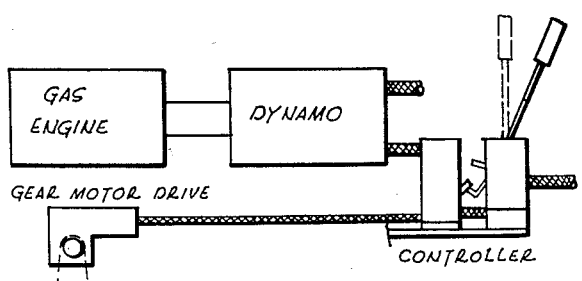
Figure 2 is a diagrammatic or schematic view of the major elements shown in Fig. 1.
Figure 1A:
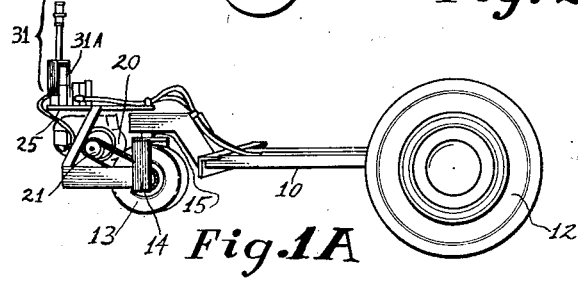
Figure 3:
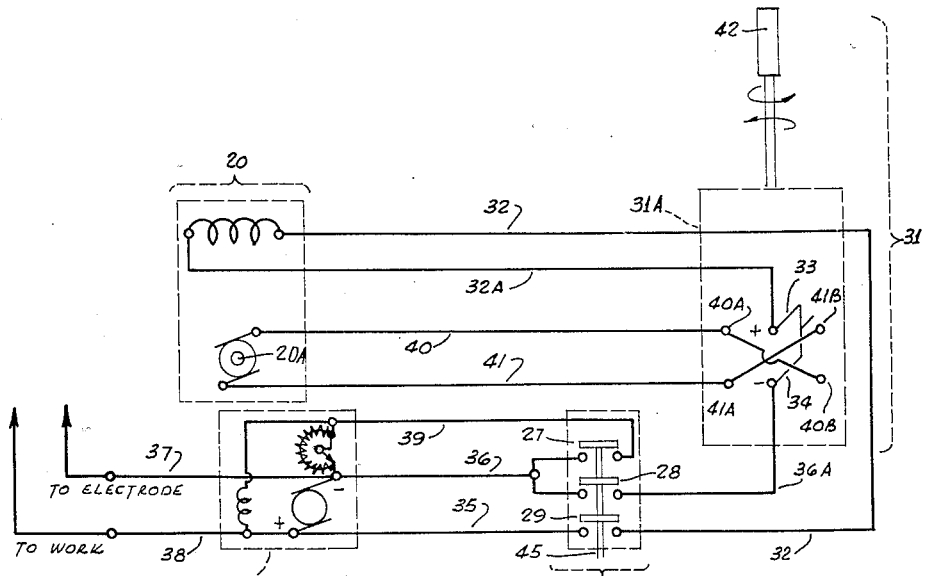
Figure 3 is a wiring diagram of a simplified circuit that may be employed for practicing the invention.

As can be observed by Fig. 1, a chassis 10 is mounted for mobility on axle 11 having two relatively large main wheels 12, 12A and a forward steering wheel 13 in fork 14, the shank 15 of which is pivotally assembled in reach 10A of the chassis. This shank is of rugged construction and projects for permanent rigid attachment to controller base 16 on which are mounted control units hereinafter described and referred to as a tiller. On the chassis are mounted a complete welding dynamo 17 with the usual complement of controls employed for delivering current for arc welding and/or cutting, however, only a simple shunt field and rheostat are indicated therefor in Fig. 3; gasoline engine 18 directly connected thereto; radiator 19 and all the accessories for the normal operation of such apparatus. Since this equipment is well understood and these latter designated elements form no part of the invention further description would be redundant. However, the chassis is equipped with a series wound motor 20 having a worm gear and a reduced speed shaft 20A projecting therefrom with sprocket 21 keyed thereto and in alignment with sprocket 22 keyed to wheel 12 so that power from the motor can be transmitted thereto by chain 23 for propelling the undercarriage. Through suitable mechanism, lever 24 raises and retains the motor and gearing, with the chain taut for the stated service. Through this equipment the motor may be lowered sufficiently to release and thereby remove the chain in order that the undercarriage can be towed when it is to be used at locations too distant for self propulsion. Since this electric motor drive mounting required certain special adaptions for each of the various standard welding dynamos moving in commerce when mounted on the chassis shown in Fig. 1, a chassis for receiving these various dynamos without special modifications was conceived and developed as shown in Fig. 1A. Here it will be observed that the electric motor 20 and worm geared reduction head, described above, have been mounted on an enlarged controller base 25, and that the steering vehicular wheel is equipped with a sprocket and a chain to receive propelling power from motor 20. The controller base, obviously, also functions as a steering lever or tiller.

Figure 4:
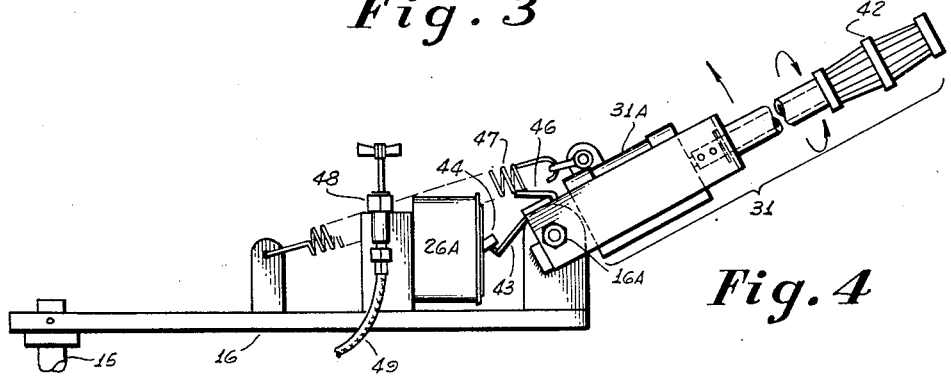
Figures 4 and 5 are views in elevation, respectively at operated and normal positions, on an enlarged scale, of the steering apparatus constructed as a tiller, also housings for circuit controlling means comprising a convertor and a selector switch.
Figure 5:
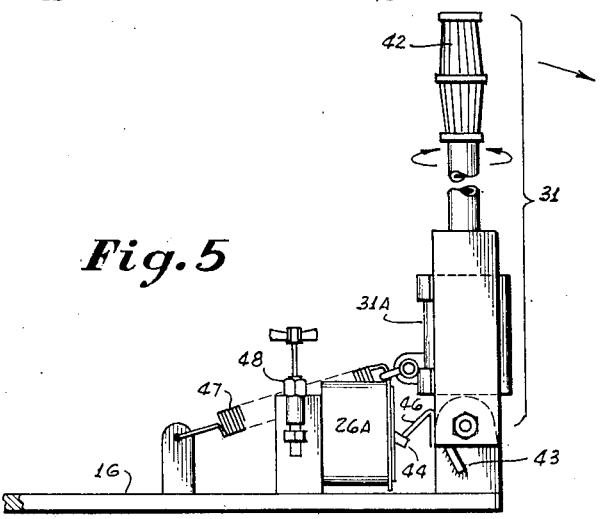

It is to be understood that the detailed construction of a highly developed welding dynamo and its involved controls are not indicated in the wiring diagram since they are not necessary for an understanding of this invention. However, in Fig. 3 there is indicated a simple shunt excited dynamo comprising an armature, brushes and shunt field winding with rheostat, indicated as a unit and designated by numeral 17; also indicated are service wires 35, 36; conductors 37, 38 for welding operations; the conversion switch 26 (consisting of three blades 27, 28 and 29 and associated contacts, biased normally at the open position as shown); series motor comprising an armature 20A, brushes and field winding referred to above as 20, and a controller 31 having two pairs of contacts and associated switch blades 33 and 34 so constructed as to retain the circuits controlled thereby normally open. This normally open state of the conversion switch unit also the selector switch of the controller unit are so maintained for and during welding operations. In Figs. 4 and 5 these switches are located, respectively in housings identified by numerals 26A, 31A. These figures also illustrate apparatus for selectively closing the contacts and then for returning them to normal as will be explained hereinafter. Returning to Fig. 3: While the engine is driving the dynamo, voltage is maintained on said service wires and the conductors. Current may be used for welding provided the contacts of convertor and of course selector switches are normal or open. With all of the switches of the convertor closed, which occurs simultaneously when the controller is moved to the position shown in Fig. 4, the dynamo voltage becomes impressed on wires 32 and 36A concurrently with blade 27 effecting a direct shunt circuit (without external resistance) for the dynamo field excitation by connecting negative wire 36 with wire 39. Positive voltage is now impressed upon wire 32, the field of motor 20 wire 32A and positive blade 33 while negative voltage is impressed upon wire 36A and blade 34 preparatory for propelling the undercarriage by current impressed upon the windings of the motor. With the brushes of the motor's armature commutator connected through wires 40, 41 to the switch for receiving either positive current from blade 33 or negative current from blade 34, according to which one engages the contacts associated therewith, it becomes obvious that the undercarriage will be propelled either forwardly or backwardly at the will of the operator simply by twisting grip 42.

The convertor-controller, shown as a unit in Figs. 4 and 5, comprises the convertor switch 26, the controller 31 which includes the selector switch elements, a twistable grip 42 and a tension spring 47 for retaining the controller in the vertical position as shown in Fig. 5, here the switch blades 33, 34 are out of engagement with their associated contacts. When, and only when, the controller is in the "down" or operated position, as shown in Fig. 4, all of the convertor contacts are closed by finger 43 having actuated switch lever 44, which in turn moves switch bar 45. The circuits associated with the selector switch remain open, as stated above, until the switch grip is oriented as indicated by the curved arrows adjacent thereto. In response to grip 42 being twisted in a clockwise direction blades 33, 34 engage contacts 40A, 41A to effect forward movement of the undercarriage while counterclockwise movement of the grip reverses the switch blades for engagement with contacts 40B, 41B and the polarity of the current flowing to the armature, thereby effecting backward travel of the undercarriage. Thus, it will be observed that so long as the operator retains the controller for the stated operated position he will walk with and steer the undercarriage to the objective location, when merely upon release of the controller it is retrieved to the normal state as shown in Fig. 5. Here, it should be noted, as in Fig. 1A, that since the controller is ruggedly hinged to base plate 16 at 16A these combined elements form an effective tiller for guiding the undercarriage. Since the operation of motor 20 can be effected only in response to the grip being twisted to energize the motor, obviously, the apparatus is restored to normal upon release of said controller, preparatory for welding operations. As the controller returns to normal, another finger 46, integral therewith, engages switch lever 44 so as to move bar 45 and the switch blades thereof to the position shown in Fig. 3 in order to convert or restore the dynamo for welding and cutting use only.

While the symbol for a double pole, double throw switch has been employed to explain the construction and operation of the selector switch it is to be understood that this switch must be constructed to remain normally open and responsive to the "twist grip" as stated above. Such switches are well known and are currently supplied to the related industries by several manufacturers.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A portable welding outfit comprising a chassis on wheels; a standard welding dynamo, equipped with conventional controls adjusted for delivering current having chosen characteristics for a given production welding operation, direct-connected to a prime mover and mounted thereon; a reversible electric motor geared to one of said wheels for propelling the outfit forwardly or rearwardly; and means for instantaneously establishing electrical connection between said dynamo and said motor and concurrently conditioning the dynamo for delivering current having proper characteristics for driving said motor while retaining the said controls as set for welding operation.

2. A portable welding outfit comprising a chassis on wheels; a standard welding dynamo, equipped with conventional dynamo controls adjusted for delivering current having chosen characteristics for a given production welding operation, direct-connected to a prime mover and mounted thereon; a guiding and controlling unit mounted on said chassis; a reversible electric motor mounted on said chassis and geared to one of said wheels for propelling the outfit forwardly or rearwardly; a tiller for guiding the outfit and operably associated with the control unit for instantaneously conditioning the dynamo for delivering current having proper characteristics for driving said motor while retaining the said controls as set for said welding operation and establishing electrical connection between said dynamo and said motor; and other means for selecting the direction of rotation thereof, applying current thereto sequentially and other means cooperating with said control means for restoring the function thereof to normal.

3. A portable welding outfit comprising a chassis on wheels; a standard welding dynamo, equipped with conventional dynamo controls adjusted for delivering current having chosen characteristics for a given production welding operation, direct-connected to a prime mover and mounted thereon; a guiding and controlling unit mounted on said chassis; a reversible electric motor mounted on said chassis and geared to one of said wheels for propelling the outfit forwardly or rearwardly; said unit comprising a tiller for guiding the outfit and manually operable control means for instantaneously conditioning the dynamo for delivering current having proper characteristics for driving said motor and establishing electrical connection from said dynamo to a control for said motor for selecting the direction of rotation thereof and applying current thereto while retaining the said dynamo controls as set for said welding operation and further other means for cooperating with said manually operable control means for restoring the function of said dynamo controls when an operator releases the last said control means.

4. A portable welding outfit comprising a chassis on wheels; a standard welding dynamo, equipped with conventional dynamo controls adjusted for delivering current having chosen characteristics for a given production welding operation, direct-connected to a prime mover and mounted thereon; a base plate secured to said chassis; a reversible electric motor mounted on said chassis and geared to one of said wheels for propelling the outfit forwardly or rearwardly; a tiller for guiding the outfit and manually operable control means mounted on said plate for instantaneously conditioning the dynamo for delivering current having proper characteristics for driving said motor and establishing electrical connection from said dynamo to a control for said motor and other means for selecting the direction of rotation thereof and applying current thereto while retaining the said dynamo controls as set for said welding operation and further other means for cooperating with said manually operable control means for automatically restoring the function of said dynamo controls when an operator releases said manually operable control means.

5. A portable welding outfit comprising a chassis on three wheels, one of which is mounted in a fork pivoted in said chassis; a standard welding dynamo, equipped with conventional dynamo controls adjusted for delivering current having chosen characteristics for a given production welding operation, direct-connected to a prime mover and mounted thereon; an elongated plate secured to said fork thereby providing a tiller for guiding the outfit; a reversible electric motor mounted on said chassis and geared to one of said wheels for propelling the outfit forwardly or rearwardly; a manually operable control means mounted on said plate for instantaneously establishing electrical connection from said dynamo to a control for said motor and concurrently conditioning the dynamo for delivering current having proper characteristics for driving said motor while retaining the said dynamo controls as set for said welding operation and other means for selecting the direction of rotation of said motor and applying current thereto, and further other means for cooperating with said manually operable control means for automatically restoring the function of said dynamo controls when an operator releases said manually operable control means.

6. A portable welding outfit comprising a chassis on three wheels, one of which is mounted in a fork pivoted in said chassis; a standard welding dynamo, equipped with conventional dynamo controls adjusted for delivering current having chosen characteristics for a given production welding operation, direct-connected to a prime mover and mounted thereon; an elongated plate secured to said fork thereby providing a tiller for guiding the outfit; a reversible electric motor mounted on said plate and geared to the said wheel mounted in the fork for propelling the outfit forwardly or rearwardly; manually operable control means mounted on said plate for instantaneously establishing electrical connection from said dynamo to a control for said motor and concurrently conditioning the dynamo for delivering current having proper characteristics for driving said motor while retaining the said dynamo controls as set for said welding operation and other means for selecting the direction of said motor and applying current thereto, and further other means for cooperating with said manually operable control means for automatically restoring the function of said dynamo controls when an operator releases said manually operable control means.

References Cited in the file of this patent
UNITED STATES PATENTS

| | | |
|---|---|---|
| 1,527,431 | Gumppers | Feb. 24, 1925 |
| 1,585,351 | Ionides | May 18, 1925 |
| 1,966,245 | Harvey | July 10, 1934 |
| 2,244,063 | Hobart | June 3, 1941 |
| 2,395,323 | Framhein | Feb. 19, 1946 |
| 2,399,605 | Schroeder | Apr. 30, 1946 |
| 2,478,327 | Schreck | Aug. 9, 1949 |
| 2,513,718 | Gfrorer | July 4, 1950 |
| 2,645,297 | Wennberg et al. | July 14, 1953 |
| 2,706,008 | Voight | Apr. 12, 1955 |